United States Patent [19]
Heinemeyer

[11] 3,813,040
[45] May 28, 1974

[54] PLASTIC RAILWAY CROSSTIE

[75] Inventor: Ben W. Heinemeyer, Lake Jackson, Tex.

[73] Assignee: The Dow Chemical Company, Midland, Mich.

[22] Filed: July 5, 1972

[21] Appl. No.: 269,106

[52] U.S. Cl. .............................................. 238/84
[51] Int. Cl. ............................................ E01b 3/10
[58] Field of Search ............ 264/46, 51; 238/84, 83, 238/283, 315; 105/358

[56] References Cited
UNITED STATES PATENTS

| | | | |
|---|---|---|---|
| 3,289,940 | 12/1966 | Groff | 238/29 |
| 3,565,336 | 2/1971 | Eisses | 238/265 |
| 3,598,312 | 8/1971 | Hamilton, Jr. | 238/84 |
| 3,656,690 | 4/1972 | Hanig | 238/2 |
| 3,687,087 | 8/1972 | Yuroski et al. | 105/358 |

*Primary Examiner*—Robert G. Sheridan
*Assistant Examiner*—Richard A. Bertsch
*Attorney, Agent, or Firm*—William M. Yates; Richard G. Waterman; Ralph M. Mellom

[57] ABSTRACT

A cellular thermoplastic product such as a railway crosstie is produced by an apparatus comprising extrusion means for producing a web of a foamable thermoplastic polymer such as polyethylene, a mold corresponding to the size and shape of the cellular product positioned adjacent the extrusion means to receive the web of foamable thermoplastic polymer, and means for imparting relative reciprocal motion between the mold and the extrusion means in a direction generally normal to one of the surfaces of the web such that the web is deposited in layers within the mold. In producing a cellular thermoplastic product by the method of the invention, the steps include plastifying a thermoplastic polymer such as polyethylene in the presence of an expanding agent to produce a foamable thermoplastic polymer, forming the foamable thermoplastic polymer into a web, depositing the web into a mold, and imparting relative reciprocal motion between the web and the mold in a direction normal to at least one surface of the web such that the web is deposited in layers within the mold. The foamable thermoplastic layers in the mold fuse together at their mating surfaces thereby resulting in the cellular thermoplastic product.

3 Claims, 3 Drawing Figures

PATENTED MAY 28 1974

3,813,040

PLASTIC RAILWAY CROSSTIE

This invention relates to the art of cellular products. In one aspect, this invention relates to methods and apparatus for producing cellular products. In another aspect, this invention relates to the production of cellular thermoplastic products which are relatively long in one direction as compared to their length in the two other directions. In yet another aspect, the invention relates to thermoplastic polymer railway ties.

Cellular products of a thermoplastic polymer are normally produced by extrusion, by injection molding, or by a combination of the two techniques. Various modifications in these basic processes have been developed in order to produce a cellular product of a particular type and configuration.

In the extrusion technique, a normally solid thermoplastic polymer is heat-plastified such as in an extruder in the presence of a blowing agent to produce a molten mass which is maintained under sufficient pressure to prevent expansion of the blowing agent. The molten mass is then forced from the extruder into a zone of lower pressure such that the blowing agent expands thereby forming cells in the thermoplastic polymer. In the injection molding technique, the thermoplastic polymer is plastified in an extruder in the presence of a blowing agent and the resulting foamable mass is rapidly discharged from the extruder into a mold at a pressure which will allow the blowing agent to expand and form a cellular product corresponding to the interior configuration of the mold. In the combination extrusion-injection molding technique, an extruder plastifies a normally solid thermoplastic polymer in the presence of a blowing agent and the resulting foamable mass is introduced into an accumulation zone under sufficient pressure to prevent the blowing agent from expanding. When the accumulator has received the desired amount of foamable polymer, it is discharged by injecting the foamable polymer into a mold wherein the blowing agent is allowed to expand and thereby produce the cellular product. A variety of different blowing agents can be employed in these processes. The selection of a blowing agent is dependent upon its performance in a particular process. The so-called volatile type blowing agents, such as a halogenated fluorine-containing hydrocarbon, are particularly suitable in the extrusion process. The so-called decomposable blowing agents, such as azodicarbonamide, enjoys widespread use in many of the processes. The volatile blowing agent is normally introduced into the extruder after the thermoplastic polymer has been plastified whereas the decomposable blowing agent is usually pre-blended with the thermoplastic polymer before it is introduced into the plastifying apparatus.

The several prior art methods and apparatus for producing cellular thermoplastic products suffer from the disadvantage that they cannot readily be employed in a simple and economical manner to produce molded products of all sizes and shapes. In the extrusion method, for example, cellular products which are relatively long in comparison to their height and width cannot easily be produced by extruding into a mold because the pressure necessary to force the foamable mass into the remote sections of the mold causes many of the cells to collapse before the polymer solidifies. The same shortcoming exists in the combination extrusion-injection molding process. In the injection molding process, relatively long cellular products are difficult and slow to produce because the molding occurs at high pressure thus necessitating the use of high strength molds. This requirement tends to make the injection molding technique economically less attractive for producing cellular products of the type herein described.

According to this invention, the disadvantages of the prior art methods and apparatus for producing cellular products are overcome by an apparatus comprising the combination of extrusion means for producing a web of a foamable thermoplastic polymer, a mold having an open side positioned adjacent the extrusion means to receive the web of foamable thermoplastic polymer, and means for imparting relative reciprocal motion between the mold and the extrusion means in a direction generally normal to at least one surface of the web of foamable thermoplastic polymer such that the web is deposited in layers within the mold. The method of producing a cellular thermoplastic product comprises the steps of plastifying a thermoplastic polymer in the presence of an expanding agent to produce a foamable thermoplastic polymer, forming the foamable thermoplastic polymer into a web, depositing the web of foamable thermoplastic polymer into a mold, and imparting relative reciprocal motion between the web of foamable thermoplastic polymer and the mold in a direction generally normal to at least one surface of the web such that the web is deposited in layers within the mold. The resulting cellular thermoplastic product has utility in a variety of fields and can have any suitable density such as between about 2 and about 55 pounds per cubic foot. One of such utilities is a railway crosstie comprising an elongated body of a cellular thermoplastic polymer having a density of between about 20 and about 50 pounds per cubic foot and preferably between about 30 and about 45 pounds per cubic foot, the elongated body having a multitude of individual closed cells disposed substantially throughout the elongated body. In general, the higher the density of the cellular product the larger the size of the individual cells. The cellular thermoplastic products of the invention usually have a cell size of between about 0.1 and about 3 mm. although it is possible to have individual cells up to about 12 mm.

Accordingly, it is an object of this invention to provide an improved railway crosstie.

Another object of this invention is to produce cellular thermoplastic products.

A further object of this invention is to provide a method and apparatus for producing cellular thermoplastic products which are relatively long as compared to their width and height.

Still another object of this invention is to provide a method and apparatus for producing relatively large cellular thermoplastic products from a web of the thermoplastic product.

These and other objects of the invention will become apparent to one skilled in the art after studying the following detailed description, the appended claims, and the accompanying drawing wherein:

Many details of the apparatus including switches, heating and cooling elements, control lines, gauges, valves, guards and other safety devices, and the like, not necessary in explaining the invention to one skilled in the art, have been omitted from the drawings for the sake of clarity.

Figure 1:
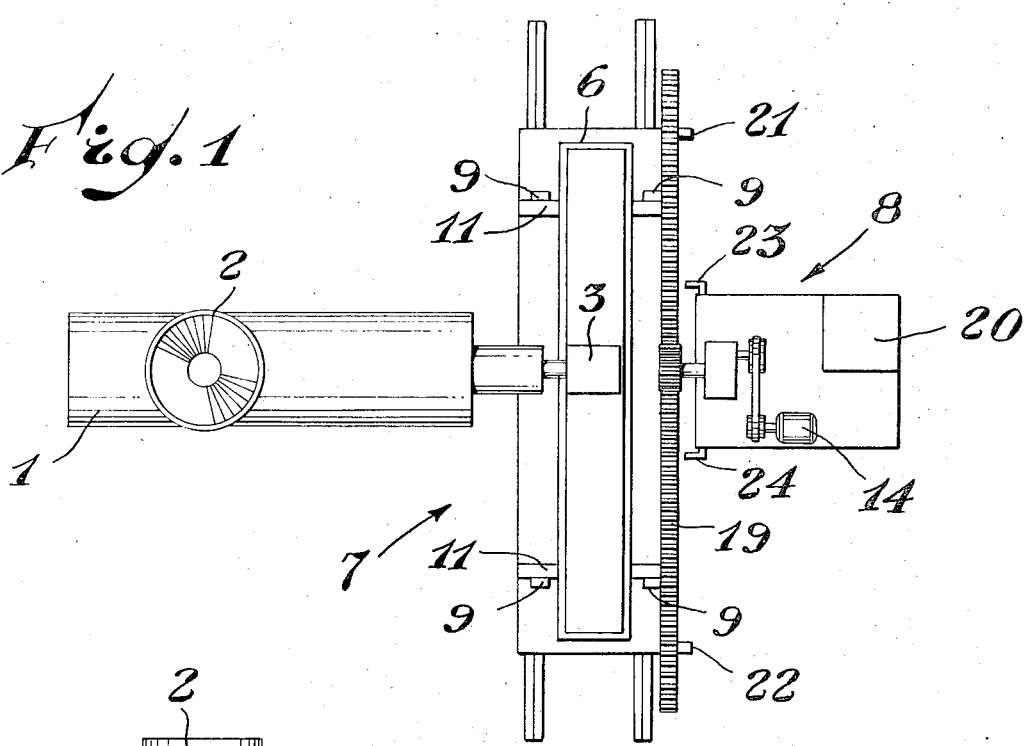
FIG. 1 is a plan view of an apparatus constructed in accordance with one embodiment of the invention.
Figure 2:
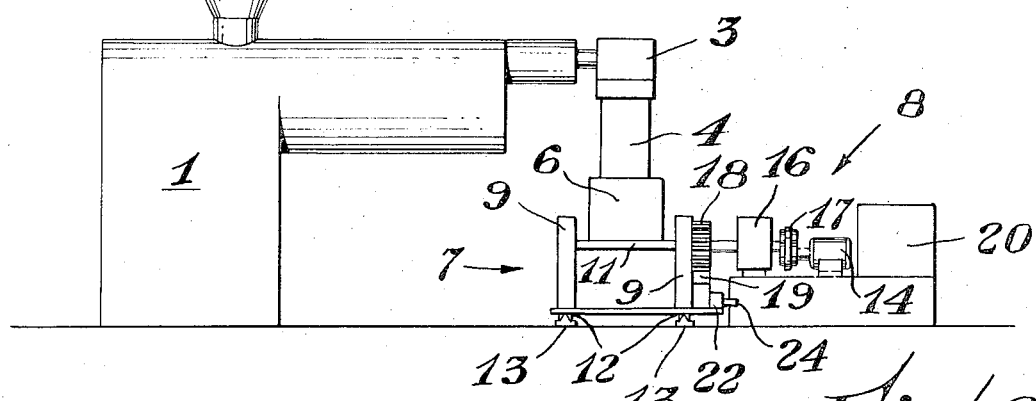
FIG. 2 is a side elevation of the apparatus illustrated by FIG. 1.

Referring now to the drawing, wherein like referenced numerals are used to denote like elements when convenient, the illustrated embodiment of the invention will be described in more detail. In FIGS. 1 and 2, an extrusion means for producing a web of a foamable thermoplastic polymer includes an extruder 1 having a hopper 2 for receiving a blend of a thermoplastic polymer in the form of beads or pellets and a blowing agent. The extrusion means also includes a die 3 connected to the discharge end of the extruder 1. The die 3 has a discharge opening in the shape of a slot (not shown) which forms the foamable thermoplastic polymer into a web 4. A mold 6 with an open top is positioned adjacent and beneath the die 3 such that the web 4 of foamable thermoplastic polymer is deposited by gravity downward into the mold.

The means of the apparatus for imparting relative reciprocal motion between the mold 6 and the extrusion means includes means for moving the mold. Illustrative means for moving the mold comprises a movable base shown generally by reference numeral 7 for supporting the mold, drive means shown generally by reference numeral 8 for imparting reciprocal motion to the base, and control means connected between the base and the drive means for terminating the travel of the mold in a given direction of travel and for delaying the travel of the mold in the opposite direction for a predetermined period of time. In this embodiment, the means for imparting the relative reciprocal motion between the mold and the extrusion means applies the motion in a direction generally normal to at least one of the major surfaces of the web 4.

The movable base 7 for supporting the mold comprises spaced vertical supports 9, spaced horizontal supports 11 carried by the vertical supports 9, and grooved rolls 12 carried at the lower end of each of the vertical supports 9. A pair of spaced rails 13 are positioned beneath the movable base 7 in register with the grooved rolls 12. The movable base 7 also includes a plurality of horizontal and vertical members (not shown) which secure the vertical supports 9 and the horizontal supports 11 into a rigid frame which can be moved in a reciprocal manner on the rails 13 as will be more fully described hereinafter.

In the embodiment illustrated, the drive means 8 for imparting motion to the base 7 includes an electric motor 14, a gear reduction assembly 16 connected to the motor 14 by a belt 17, a pinion gear 18 connected to the gear reduction assembly 16, and a rack 19 carried by the movable base 7 and positioned to engage the pinion gear 18.

The control means connected between the base 7 and the drive means 8 for terminating the travel of the mold in a given direction of travel and for delaying the travel of the mold in the opposite direction for a predetermined period of time includes a dual timer system 20 which operates in sequence with two limit switches 21 and 22 carried on opposite ends of the base 7. The control means also includes two limit stops 23 and 24 operatively connected between the dual timer system 20 and the limit switches 21 and 22.

Figure 3:
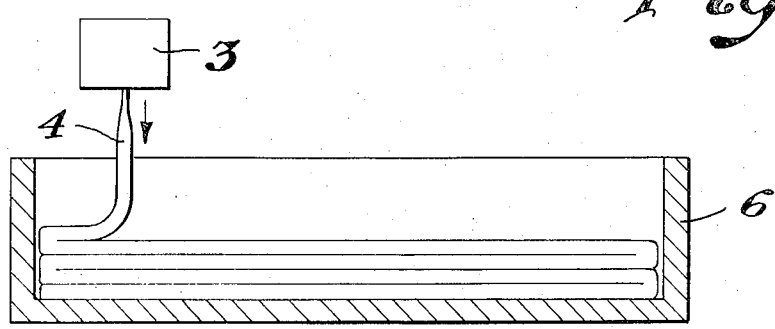
FIG. 3 is an illustration of a web of foamable thermoplastic polymer as it is deposited into a mold.

As illustrated by FIG. 3 of the drawing, the web 4 of foamable thermoplastic polymer issues from the die 3 into the mold 6 where it is deposited in layers due to the relative reciprocal motion between the extrusion means and the mold.

In practicing the method of the invention by the apparatus illustrated in the drawing, pellets or beads of a normally solid synthetic thermoplastic polymer are charged to the extruder 1 from the hopper 2 whereupon they become heat-plastified into a molten mass. When a decomposable blowing agent is employed, it is normally charged to the extruder along with the polymer pellets. When a volatile blowing agent is employed, it is normally introduced into the extruder at a point where the polymer pellets become heat-plastified. In either event, sufficient pressure is maintained on the molten mass in the extruder so as to prevent the blowing agent from expanding. The resulting foamable thermoplastic polymer is then formed into the web 4 as a result of being forced through the die 3 by the action of the extruder 1. The web 4 of foamable thermoplastic polymer is then deposited by gravity downward into the mold 6 and relative reciprocal motion is imparted between the web 4 and the mold 6 in a direction generally normal to at least one major surface of the web such that the web is deposited in layers within the mold. The relative reciprocal motion is imparted between the mold and the web by moving the mold by means of the drive means 8 and the control means 20.

At the beginning of a typical cycle, wherein the mold is of box-like shape of generally rectangular configuration as viewed in plan and being relatively narrow in width as compared to length and positioned such that the transverse direction of the web of foamable thermoplastic polymer extends across the width of the mold, the mold 6 is positioned beneath the die 3 such that the web 4 of foamable thermoplastic polymer will initially be deposited into one end of the mold. When extrusion is initiated and the web is deposited into the end of the mold, the electric motor 14 is actuated so as to drive the pinion gear 18 which engages the rack 19 and thereby imparts motion to the mold 6. When the base 7 and the mold 6 have been moved to a position such that the web 4 is being deposited into the opposite end of the mold, one of the limit switches 21 or 22 (depending upon the direction of travel) will contact one of the limit stops 23 or 24 thereby terminating the travel of the mold in that direction. After a predetermined period of time, which is programmed into the timer system 20 so as to allow the web to be deposited into the end of the mold to the level desired, the motor 14 is actuated and the pinion gear rotated in the opposite direction thereby causing the base 7 and the mold 6 to move back beneath the die 3. When the mold has been moved back to its starting position, the other limit switch engages the other limit stop and travel of the mold is interrupted until the web has been deposited to the desired level. The cycle is repeated a sufficient number of times to produce the desired amount of foamable thermoplastic polymer in the mold.

In describing the method and apparatus of the invention, the term "foamable" means that the thermoplastic polymer is capable of additional foaming. Thus, in describing the web as being a foamable thermoplastic polymer it is meant that the thermoplastic polymer will undergo further foaming even though a substantial amount of foaming has occurred such as shortly after the web issues from the die.

Since the web of foamable thermoplastic polymer is hot when it is deposited into the mold, the mating surfaces of the resulting layers will fuse together and form an integral cellular product. Of course, the web can be cooled during its travel between the die and the mold if desired. This can be accomplished by directing cool air or a very thin mist of water against the moving web.

When the mold has been filled to the desired level, the web is severed and the mold removed from the support. A lid is then secured to the open side of the mold by any suitable and convenient means. The layers of foamable thermoplastic polymer then continue to foam in the mold thereby producing a cellular product which is relatively long as compared to its width and height. The mold can be constructed of a size to produce a railway crosstie having the desired density.

The cellular thermoplastic products of the invention can be prepared from a variety of polymer materials. Exemplary polymer materials include olefin polymers such as polyethylene, polypropylene, and the like; copolymers of a 1-olefin and another copolymerizable monomer such as ethylene/vinyl acetate copolymer, ethylene/ethyl acrylate copolymer, and the like; and styrene containing polymers. Blends of two or more of the foregoing thermoplastic polymers can also be formed into the cellular thermoplastic products of the invention.

Exemplary decomposable blowing agents which can be employed in the practice of the invention include azodicarbonamide, ammonium carbonate, azobisisobutyronitrile, and the like. Exemplary volatile blowing agents which can be employed include dichlorodifluoromethane, dichlorotetrafluoroethane, monochlorodifluoromethane, perfluorocyclobutane, and the like. The amount of blowing agent employed will depend upon such factors as the density desired in the cellular product, the size and shape of the cellular product, the type of thermoplastic material, and the like. In general, the blowing agent is present in an amount between about 0.1 and about 20 weight percent based upon the weight of the polymer material and blowing agent.

The cellular thermoplastic products can also contain coloring agents, stabilizers, fillers, nucleating agents, cell size control agents, and the like. In the fabrication of a railway tie according to the invention, it is generally preferred that carbon black be added to the thermoplastic polymer material. The carbon black can be present in an amount between about 0.1 and about 25 and preferably between about 0.5 and about 5 weight percent based upon the total weight of the thermoplastic material and the carbon black. The strength of the railway tie or other article can also be increased by the addition of glass fibers. In general, glass fibers having an average length of between about 0.0625 and about 0.5 inch can be present in the cellular thermoplastic product in an amount between about one and about 40 and preferably between about 5 and about 25 weight percent based upon the total weight of the cellular product. The cellular product can also be partially cross-linked by means of a chemical crosslinking agent or by irradiation if desired.

The cellular thermoplastic products of the invention can be varied in construction to satisfy a particular need. For example, when the cellular product is in the form of a railway crosstie the density can be different in various portions of the crosstie. The crosstie can be made with a relatively low density center and the density can increase with distance from the center to the top and bottom surfaces. This can be effected by using less blowing agent at the beginning and the end of the fabrication cycle. Similarly, the concentration of glass fibers can be varied in the railway crosstie such that higher concentrations exist on the top and bottom surfaces as compared to the concentration in the central portion of the crosstie. This can be effected by metering higher quantities of glass fibers into the extruder near the beginning and end of the fabrication cycle. Of course, crossties made with one or both of these modifications exhibit high strength. In all embodiments, the cellular railway crosstie is particularly advantageous because of the ease with which rail spikes can be driven into the crosstie for securing rails and the like.

The following example is illustrative of one technique which can be employed for preparing a cellular product in accordance with the invention. It is to be understood that this example is for illustration only and should not be construed as limiting of the invention.

EXAMPLE

A mixture of 96 parts by weight high density polyethylene granules and 0.01 part by weight mineral oil wetting agent is blended for about 10 minutes with 1 part by weight azodicarbonamide and 3 parts by weight carbon black concentrate containing about 35 weight percent carbon black and 65 weight percent high density polyethylene. The resulting blend is then charged to a preheated extruder having a slot die with an outlet opening about 8 inches long and about ½ inch wide positioned downward. The extruder is then operated at a temperature of about 495° F to produce a web of foamable polyethylene. A box-like rectangular mold with an open top and having inside dimensions of about 98 inches in length, 8.25 inches wide, and 6.25 inches high is positioned beneath the die such that the transverse direction of the web extends across the width of the mold. The web is initially deposited into one end of the mold and the mold moved in a direction longitudinal with its length during extrusion. When the other end of the mold has been moved into position beneath the die, movement of the mold is stopped momentarily until the web is deposited evenly within the mold and then travel is initiated in the opposite direction. This reciprocal movement is continued until the mold is almost filled with the foamable thermoplastic polymer. Extrusion is then interrupted, the mold removed, and a cover secured to the open top. The foamable thermoplastic polymer continues to foam in the mold until the uppermost layer has been forced into contact with the interior surface of the mold cover. The mold is then allowed to cool to normal room temperature, the cover removed, and the cellular thermoplastic product removed. The cellular product produced in this manner has a density of about 35 pounds per cubic foot and is particularly suitable for use as a railway tie.

The invention can easily be modified to produce cellular thermoplastic products on a continuous or semi-continuous basis. This can be accomplished by employing a multi-head die extruder with two or more slot dies.

It is evident that many modifications can be made in the apparatus and method described. For example, a drive gear and an endless chain can be used to impart reciprocal motion to the mold instead of the illustrated rack and pinion gear. Similarly, a variety of different control means can be employed to regulate the travel of the mold during extrusion.

Although the invention has been described in considerable detail, it must be understood that such description is for the purpose of illustration only, and that many variations and modifications can be made without departing from the spirit and scope of the invention.

What is claimed is:

1. A railway crosstie comprising an elongated body of a cellular thermoplastic polymer having a density of between about 20 and about 50 pounds per cubic foot, said elongated body having a multitude of individual closed cells disposed substantially throughout said elongated body.

2. A railway crosstie according to claim 1 wherein said thermoplastic polymer is polyethylene.

3. A railway crosstie according to claim 1 wherein said elongated body of cellular thermoplastic polymer contains a multitude of glass fibers.

* * * * *